United States Patent [19]

O'Hare

[11] 4,110,257

[45] Aug. 29, 1978

[54] RANEY NICKEL CATALYTIC DEVICE

[75] Inventor: Stephen A. O'Hare, Vienna, Va.

[73] Assignee: The United States of America as represented by the United States Department of Energy, Washington, D.C.

[21] Appl. No.: 812,303

[22] Filed: Jul. 1, 1977

[51] Int. Cl.$^2$ .................. B01J 21/04; B01J 23/74
[52] U.S. Cl. .................. 252/466 J; 252/472; 252/477 Q; 252/477 R
[58] Field of Search ............ 252/477 R, 477 Q, 466 J, 252/472; 148/11.5 Q, 127; 285/381; 428/586, 679

[56] References Cited

U.S. PATENT DOCUMENTS

| | | | |
|---|---|---|---|
| 2,408,164 | 9/1946 | Foster | 252/477 R |
| 3,362,783 | 1/1968 | Leak | 252/477 R |
| 3,972,548 | 8/1976 | Roseen | 285/381 |
| 3,980,440 | 9/1976 | Morse et al. | 252/477 R |

*Primary Examiner*—W. J. Shine
*Attorney, Agent, or Firm*—Dean E. Carlson; Judson R. Hightower

[57] ABSTRACT

A catalytic device for use in a conventional coal gasification process which includes a tubular substrate having secured to its inside surface by expansion a catalytic material. The catalytic device is made by inserting a tubular catalytic element, such as a tubular element of a nickel-aluminum alloy, into a tubular substrate and heat-treating the resulting composite to cause the tubular catalytic element to irreversibly expand against the inside surface of the substrate.

6 Claims, 3 Drawing Figures

RANEY NICKEL CATALYTIC DEVICE

BACKGROUND OF THE INVENTION

This invention was made in the course of, or under, an interagency agreement between the Bureau of Mines and the U.S. Energy Research and Development Administration.

In coal gasification processes an important step in the production of a high BTU gas is the reaction of carbon monoxide with hydrogen in the presence of a catalyst to produce methane. The catalyst normally used to promote the methane-producing reaction is a nickel catalyst known as Raney nickel. As described in U.S. Pat. No. 1,628,190 to M. Raney, The Raney nickel catalyst is produced by forming a catalyst precursor which is an alloy of either nickel and aluminum or nickel, aluminum, and silicon, and leaching the resulting alloy with a sodium hydroxide solution or other suitable caustic solvent to remove either aluminum or aluminum and silicon, respectively, leaving an activated nickel. It is conventional to place the Raney nickel catalyst in the reaction chamber in the form of pellets during the production of methane. However, because the reaction between carbon monoxide and hydrogen to form methane is highly exothermic, heat build-up within the catalyst pellets becomes a problem. In order to avoid the problem of heat build-up resulting from the use of Raney nickel pellets, the Raney nickel has been used as a flame-sprayed layer on the interior surface of stainless steel tubes in which the methane-producing reaction occurs. This method of use has the advantage of allowing the heat from the reaction to be conducted rapidly away through the tube walls. However, a problem exists in forming this type of catalytic device because it is difficult and expensive to form uniform and tightly secured layers of catalyst on the tube walls by flame spraying.

It is, therefore, an object of the present invention to provide a tubular catalytic device in which the catalytic material is present as a uniform, tightly-secured layer on the interior surface of a tubular substrate.

It is another object of the present invention to provide a method of securing a uniform layer of catalytic material to the interior surface of a tubular substrate.

These and other objects and advantages of the invention will become apparent when the following detailed description of a preferred embodiment is considered with the drawings.

SUMMARY OF THE INVENTION

This invention relates generally to a tubular catalytic device which includes a tubular substrate with a layer of catalytic material, which may be either a catalyst precursor or a catalyst, secured to the inside surface of the substrate by expansion of the catalytic material. More specifically, the present invention is directed to a tubular catalytic device in which a tubular catalytic element of Raney nickel is secured by expansion to the inside surface of a tubular substrate. The catalytic device is useful in the methane-producing reaction of the coal gasification process for confining the carbon monoxide and hydrogen reactants and for allowing intimate contact between the reactants and the Raney nickel catalyst which initiates the reaction.

The invention also includes a method of making the tubular catalytic device of the present invention by inserting a tubular catalytic element into a tubular substrate and heat-treating the composite to irreversibly expand the catalytic element against the inside surface of the substrate.

The tubular catalytic device made by the method of the present invention has the advantage attributed to previous tubular catalytic devices of being able to conduct heat rapidly away from the exothermic reaction within the catalytic device. Additionally, the tubular catalytic device of the present invention has a more uniform and tightly-secured layer of catalytic material than is obtainable by the conventional flame-spraying procedure.

Although the invention will be described in connection with a preferred embodiment considered with the drawings, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENTS

Figure 1:
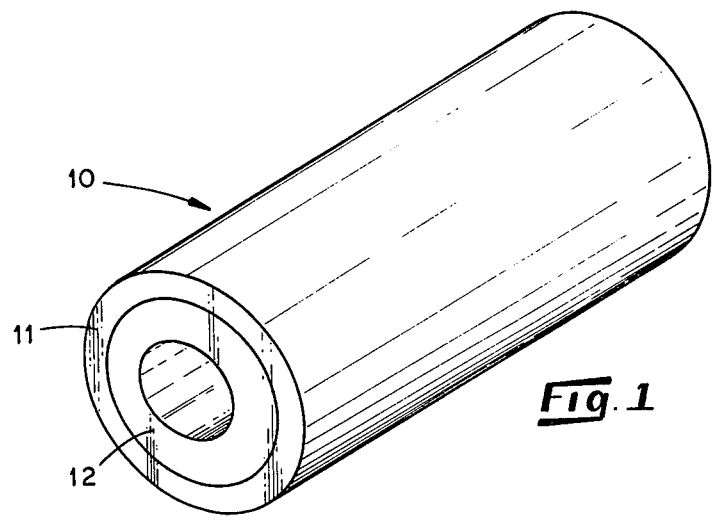
FIG. 1 is a perspective view of a catalytic device in accordance with an embodiment of the present invention in which a catalytic element is secured to the inside surface of a tubular substrate.

In the illustrated embodiment in FIG. 1 tubular catalytic device 10 includes tubular substrate 11 with tubular catalytic element 12 secured to the inside surface of substrate 11 by expansion of catalytic element 12. Catalytic element 12 can include various catalytic materials which are either catalysts or catalyst precursors. Preferably, catalytic element 12 is Raney nickel catalyst but can be a catalyst precursor, such as a nickel-aluminum alloy or a nickel-aluminum-silicon alloy.

Various materials may be used for substrate 11 and include metals, metal alloys and ceramics, with stainless steel being the preferred material. In selecting the material for use as substrate 11, consideration should be given to the material used for catalytic element 12. The substrate material should not chemically react with and deleteriously affect the catalytic material at the high temperatures of the conventional methanation reaction in the coal gasification process which range from 600° to 1000° C. Additionally, the substrate material should not undergo irreversible expansion during the heat-treating step of making catalytic device 10 in accordance with the present invention. On the contrary, although most materials selected for substrate 11 will expand to some extent during the heat-treating step, the material selected should have the tendency to contract to its preheated dimensions during the cooling of catalytic device 10 after heat treatment in order to insure a tight fit of catalytic element 12 within substrate 11.

Figure 2:
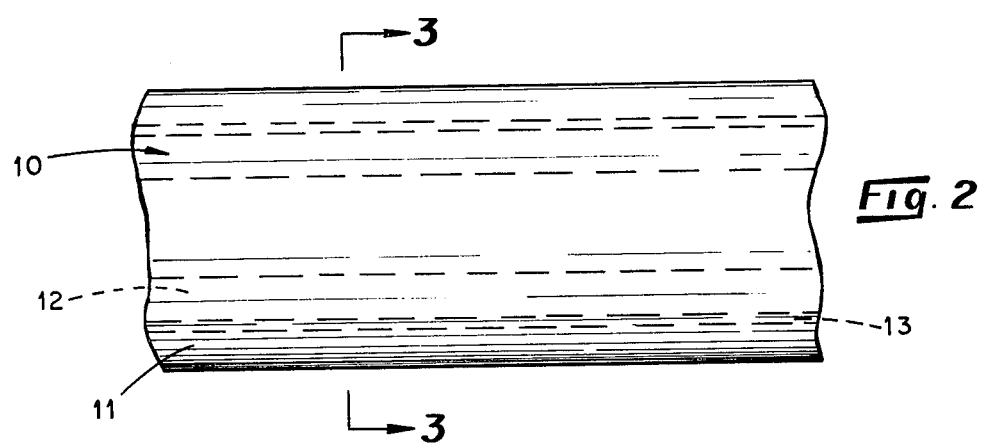
FIG. 2 is a side view of a tubular substrate having in its interior a tubular catalytic element prior to the heat treatment in accordance with an embodiment of the present invention.
Figure 3:
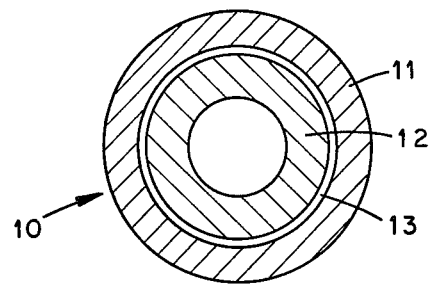
FIG. 3 is a cross-sectional view of the tubular substrate and tubular catalytic element taken along line 3—3 of FIG. 2.

In making tubular catalytic device 10 in accordance with a preferred method of the present invention a tubular catalytic element 12 is inserted into tubular substrate 11 as depicted in FIGS. 2 and 3. The outer diameter of catalytic element 12 is from 0.5 to 10.0% smaller than the inner diameter of substrate 11 to allow for expansion of catalytic element 12 against the inside surface of substrate 11. Thus, a narrow space 13 exists between the outside surface of catalytic element 12 and the inside surface of substrate 11 prior to any heat treatment.

To obtain tubular catalytic element 12 in accordance with the present invention, a catalytic material is typically melted and cast in a conventional mold. The wall thickness of catalytic element 12 can be of any desired dimensions. A typical range of thicknesses is from ¼ to 2 centimeters. The cross-sectional shape is preferably circular but any other desired cross-sectional shape, such as square, oval, or elliptical, can be used for catalytic element 12 as long as the cross-sectional shape of catalytic element 12 is the same as the cross-sectional shape of substrate 11. The preferred catalytic material for casting in tubular form is a commercially available catalyst precursor alloy of from 10–85% nickel and 90–15% aluminum. The preferred composition of this alloy contains 42% nickel and 58% aluminum. When preparing catalytic element 12 with the nickel-aluminum alloy, the cast molten metal mixture should be air-cooled rapidly to room temperature at about 23° C. in order to produce a proper phase relationship in the alloy. The alloy should exist as three major phases — $NiAl_3$, $Ni_2Al_3$, and a eutectic of $NiAl_3$ and Al. The rate of cooling necessary to produce this phase relationship is typical of conventional casting processes in which metal in molds is air-cooled.

After cast tubular catalytic element 12 has been inserted into substrate 11 the composite is heat-treated at a temperature of between 500°–850° C. for a period of time between 4 and 5 hours. The temperature can vary within this range during the heat-treatment, but it is desirable to hold the temperature constant. Preferably, the heat treatment is carried out at a temperature between 500°–600° C. It has been discovered that the heat treatment step causes an irreversible expansion of catalytic element 12 of the nickel-aluminum alloy against the inside surface of substrate 11 as depicted in FIG. 1. Although the mechanism which produces the irreversible expansion is not known with certainty, it is believed that the expansion is a result of the following solid state reaction:

$$Ni_2Al_3 + 3Al \rightarrow 2NiAl_3 \qquad (1)$$

It is also believed that during this reaction aluminum atoms migrate to the $Ni_2Al_3$ by a vacancy diffusion mechanism that results in condensation of atomic vacancies into visible holes.

The resulting catalytic device 10 depicted in FIG. 1 is allowed to cool to ambient temperature after the heat treatment. Although catalytic element 12 contacts and becomes secured within substrate 11 during the heat treatment, catalytic element 12 usually becomes more tightly held within substrate 11 as a result of the cooling step because of the tendency of substrate 11 to contract to its preheated dimensions.

After catalytic device 10 containing catalytic element 12 of the nickel-aluminum alloy has been cooled, it can be stored, transported to the site of the coal gasification process, or inserted directly into the system for coal gasification either prior to or after converting the alloy to activated nickel. In order to convert the nickel-aluminum alloy to the preferred Raney nickel catalyst, a solution of sodium hydroxide or other suitable solvent is contacted with the alloy for a period of time sufficient to leach the aluminum from catalytic element 12. The length of time required for the leaching step varies and depends upon the strength of the solvent solution and the thickness and composition of catalytic element 12, and can be easily determined experimentally.

Further details of the methods and devices of the invention will be set forth in the following illustrative example:

EXAMPLE I

A tubular element of a catalytic alloy of 42% nickel and 58% aluminum was formed by melting and pouring the alloy into a sand mold and allowing the cast alloy to air cool to 23° C. After removing the alloy element from the mold, it had an outer diameter of 5.05 centimeters and a wall thickness of about one centimeter. The alloy element was then inserted into a stainless steel tube having an inner diameter of 5.08 centimeters. The composite was placed in an oven at 530° C. and heat-treated at this temperature for 4 hours. After the heat-treating step, the device was removed from the oven and allowed to air cool to room temperature. The resulting device included the outer stainless steel tube with the inner catalytic element held tightly within the steel tube by expansion of the catalytic element.

In order to convert the nickel-aluminum alloy to Raney nickel catalyst, a 3N solution of sodium hydroxide was contacted with the alloy for a period of thirty minutes. After the leaching step was completed and the resulting Raney nickel thoroughly rinsed with water, the catalytic material remained tightly secured within the stainless steel tube.

While there has been described in the foregoing what may be considered to be preferred embodiments of the invention, modifications may be made therein without departing from the teachings of the invention and it is intended to cover all such modifications as fall within the scope of the appended claims.

What I claim is:

1. The method of making a tubular-shaped catalytic device comprising:
    (a) inserting a tubular-shaped catalytic element into a tubular-shaped substrate, and
    (b) heat-treating the resulting composite to cause the tubular-shaped catalytic element to irreversibly expand and become secured to the inside surface of said substrate.

2. The method as described in claim 1 wherein said catalytic element is a catalyst precursor alloy of nickel and aluminum and said heat-treating includes heating at a temperature between 500° and 850° C. for a period of time between 4 and 5 hours.

3. The method as described in claim 2 wherein said temperature is between 500° and 600° C.

4. The method as described in claim 2 wherein said catalyst precursor alloy is made by casting a mixture of nickel and aluminum and cooling rapidly to ambient temperature.

5. The method as described in claim 2 which includes the further step of leaching the catalytic element to convert catalyst precursor alloy to Raney nickel.

6. The tubular-shaped catalytic device produced by the method of claim 1.